(12) United States Patent
Havel et al.

(10) Patent No.: US 11,899,650 B2
(45) Date of Patent: Feb. 13, 2024

(54) USING STATISTICAL DISPERSION IN DATA PROCESS GENERATION

(71) Applicant: Capital One Services, LLC, McLean, VA (US)

(72) Inventors: Gunther Havel, McLean, VA (US); Ashwin Assysh Sharma, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 160 days.

(21) Appl. No.: 17/503,096

(22) Filed: Oct. 15, 2021

(65) Prior Publication Data

US 2023/0117925 A1    Apr. 20, 2023

(51) Int. Cl.
   *G06F 16/23*      (2019.01)
   *G06F 16/22*      (2019.01)
   *G06F 16/2453*    (2019.01)
   *G06F 18/213*     (2023.01)
   *G06F 18/21*      (2023.01)

(52) U.S. Cl.
   CPC ........ *G06F 16/2365* (2019.01); *G06F 16/221* (2019.01); *G06F 16/24545* (2019.01); *G06F 18/213* (2023.01); *G06F 18/2193* (2023.01)

(58) Field of Classification Search
   CPC ............... G06F 16/2365; G06F 16/221; G06F 16/24545; G06F 18/2193; G06F 18/213
   USPC ........................................................ 707/687
   See application file for complete search history.

(56) References Cited

U.S. PATENT DOCUMENTS

2019/0102921 A1*  4/2019  Mittal ................. G06F 16/2272
2022/0382751 A1* 12/2022  Dhuse ................. G06F 16/2282

* cited by examiner

*Primary Examiner* — Robert W Beausoliel, Jr.
*Assistant Examiner* — Lauren Zannah Ganger
(74) *Attorney, Agent, or Firm* — Perkins Coie LLP

(57) ABSTRACT

Methods and systems are described herein for facilitating data integrity processes using measures of statistical dispersion (e.g., gini impurities) of dataset features. The described mechanism may be also be used for selection and dimensionality reduction. Dimensionality reduction may enable storing the dataset using less storage space or performing other operations on the dataset using less resources. In some embodiments, the above described mechanism may be used for supervised categorial clustering and/or categorical classification.

17 Claims, 8 Drawing Sheets

| Record ID | Shape | Color | Material | Feature A |
|---|---|---|---|---|
| 1 | Cube | Blue | Metal | AZAA |
| 2 | Sphere | Red | Metal | AZAA |
| 3 | Sphere | Blue | Plastic | AXAA |
| 4 | Cone | Green | Wood | AYAA |
| 5 | Cube | Blue | Metal | AZAA |

| Record ID | Shape | Color | Material | Feature A |
|---|---|---|---|---|
| 1 | Cube | Blue | Metal | AZAA |
| 2 | Sphere | Red | Metal | AZAA |
| 3 | Sphere | Blue | Plastic | AXAA |
| 4 | Cone | Green | Wood | AYAA |
| 5 | Cube | Blue | Metal | AZAA |

FIG. 2

| 300 | | | | |
|---|---|---|---|---|
| 301 | | | | |
| 1 | Cube | Blue | Metal | AZAA |
| 5 | Cube | Blue | Metal | AZBA |
| 75 | Cube | Red | Wood | AZCA |
| 303 | | | | |
| 2 | Sphere | Red | Metal | AZAA |
| 3 | Sphere | Blue | Plastic | AXAA |
| 305 | | | | |
| 4 | Cone | Green | Wood | AYAA |
| 77 | Cone | Blue | Plastic | AYBA |

401
| 1 | Cube | Blue | Metal | AZAA |
|---|---|---|---|---|
| 5 | Cube | Blue | Metal | AZAA |

403
| 75 | Cube | Red | Wood | AZAA |
|---|---|---|---|---|
| 80 | Cube | Red | Wood | AZAA |

405
| 2 | Sphere | Red | Metal | AZAA |
|---|---|---|---|---|
| 89 | Sphere | Red | Metal | AZAA |

407
| 3 | Sphere | Blue | Plastic | AXAA |
|---|---|---|---|---|
| 3 | Sphere | Blue | Plastic | AXAA |

409
| 4 | Cone | Blue | Wood | AYAA |
|---|---|---|---|---|
| 98 | Cone | Blue | Wood | AYAA |

411
| 77 | Cone | Green | Plastic | AYAA |
|---|---|---|---|---|
| 99 | Cone | Green | Plastic | AYAA |

FIG. 4

| Feature Set | Feature Values | Target Feature; Value |
|---|---|---|
| Color;material | blue;metal | Shape;cube |
| Color;material | red;wood | Shape;cube |
| Color;material | red;metal | Shape;sphere |
| Color;material | blue;plastic | Shape;sphere |

USING STATISTICAL DISPERSION IN DATA PROCESS GENERATION

BACKGROUND

Enterprises collect and store a vast amount of data. That data is generally stored in a dataset format (e.g., in a database). Various issues exist in maintaining and using the stored data. For example, when data is updated it is always helpful to run data integrity processes on that data. However, in many instances, it is very difficult to create a data integrity process on datasets without some information indicating what kind of data is present in the dataset. In another example, it may be useful to reduce dimensionality of the data (e.g., to compress the data without loss), which is difficult without receiving metadata explaining how records or features are related to each other. In yet another example, it may be useful to perform categorical clustering on the data which is also difficult without some prior knowledge about the data and how it is organized.

SUMMARY

Solutions to the above and other issues are described in the current disclosure. In some embodiments, systems and methods are disclosed for facilitating data integrity processes. A data integrity system may be used to perform the operations for facilitating data integrity processes. When data is received in a database or the data integrity system is given database access the process may be initiated. The data may be stored, for example, in columns and rows within database tables of a database. Each column may be referred to as a feature of the dataset and a row within the database may be referred to as a record. The data integrity system may select, from a plurality of features in a dataset, a target feature, and a plurality of candidate features. For example, the data integrity system may select each feature as a target feature in turn (e.g., sequentially or run this process in parallel on each feature in the dataset). In some embodiments, the feature selection may be made by a different method (e.g., provided by a user input). When selecting the candidate features, the data integrity system may determine whether a feature includes categorical data or continuous data. The data integrity system may select as a candidate feature those features that have categorical data. For the features that have continuous data, the data integrity system may generate categories (e.g., ranges) so that continuous data can be used.

The data integrity system may then determine, for each of the plurality of candidate features, a corresponding first measure of statistical dispersion, based on the target feature for a corresponding set of records. In some embodiments, the data integrity system may generate a set of groups for each candidate feature such that each set of groups includes a corresponding set of records having a matching candidate feature. For example, if the target feature is "shape" and a given candidate feature is "color", the data integrity system may generate a group of colors for each shape. Thus, there may be groups that include blue spheres, blue cubes, green cones, red spheres, red cones, etc. For each group, the data integrity system may generate a measure of statistical dispersion. For example, the data integrity system may calculate a gini impurity value for each group and then calculate a gini impurity value for a particular feature by calculating, for example, an average (e.g., a weighted average) gini impurity value for the set of groups. The data integrity system may repeat this process for each other candidate feature (e.g., each column in a database table or in the database itself) to generate a corresponding measure of statistical dispersion (e.g., a corresponding gini impurity value).

When the data integrity system calculates a corresponding measure of statistical dispersion for each feature of the dataset (e.g., each column), the data integrity system may select a first feature having a lower first measure of statistical dispersion than other features in the plurality of candidate features. For example, if the "color" feature has the lowest gini impurity value, the data integrity system may select that feature. The data integrity system may then determine whether that lower first measure of statistical dispersion is zero or whether it is outside of a predetermined threshold.

In response to determining that the lower first measure of statistical dispersion is not zero, the data integrity system may determine, for each combination of the first feature and another feature of the plurality of candidate features, a corresponding second measure of statistical dispersion based on the target feature for the corresponding set of records. In some embodiments, the data integrity system may generate a second set of groups based on a combination of the first feature having the lower first measure of statistical dispersion and a different candidate feature of the plurality of candidate features. Each group may include a set of records having matching values in both the different candidate feature and the first feature having the lower first measure of statistical dispersion.

To continue with the examples above, if the target feature is "shape" and "color" is the first feature selected based on the "color" feature having the lowest first measure of statistical dispersion, the data integrity system may select another feature for statistical dispersion calculations. For example, the data integrity system may select "material" as the next feature. Material may be wood, metal, stone, etc. Thus, the data integrity system may calculate a measure of statistical dispersion for the combinations of "shape" and "color" values as the combinations relate to material (e.g., wood, metal, stone, etc.). Thus, the groups may include spheres that are green and metal, cones that are blue and wooden, cubes that are green and wooden, etc. The data integrity system may calculate a gini impurity value for the "material" feature as it relates to the combination of "color" and "shape" features. The data integrity system may calculate the measure of statistical dispersion for other features as they related to the combination of the target feature and the first feature.

The data integrity system may select a second feature having a lower second measure of statistical dispersion in combination with the first feature than any other feature combination. For example, the data integrity system may select, as the second feature, a feature that has a lowest gini impurity value as that feature relates to the combination of the target feature and the first feature. The data integrity system may repeat this process until the measure of statistical dispersion reaches zero or another suitable threshold is reached. In response to determining that the lower second measure of statistical dispersion satisfies a threshold, the data integrity system may generate a mapping that includes an association between an identifier of the target feature and a combination of a first identifier associated with the first feature and a second identifier associated with the second feature. For example, if the measure of statistical dispersion reaches zero, the data integrity system may generate a data integrity process for the dataset.

In some embodiments, instead of or in addition to the data integrity process, the above mechanism may be used for other functions. For example, the above described mechanism may be used for selection and dimensionality reduction. Dimensionality reduction may enable storing the dataset using less storage space or performing other operations on the dataset using less resources. In some embodiments, the above described mechanism may be used for supervised categorial clustering and/or categorical classification.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 2 illustrates a portion of a dataset that includes a plurality of feature and a plurality of records, in accordance with one or more embodiments of this disclosure.

FIG. 3 illustrates possible groupings based on a target feature, in accordance with one or more embodiments of this disclosure.

FIG. 4 illustrates possible groupings based on a combination of a target feature and a selected candidate feature, in accordance with one or more embodiments of this disclosure.

FIG. 5 illustrates a table having rules for a data integrity process, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
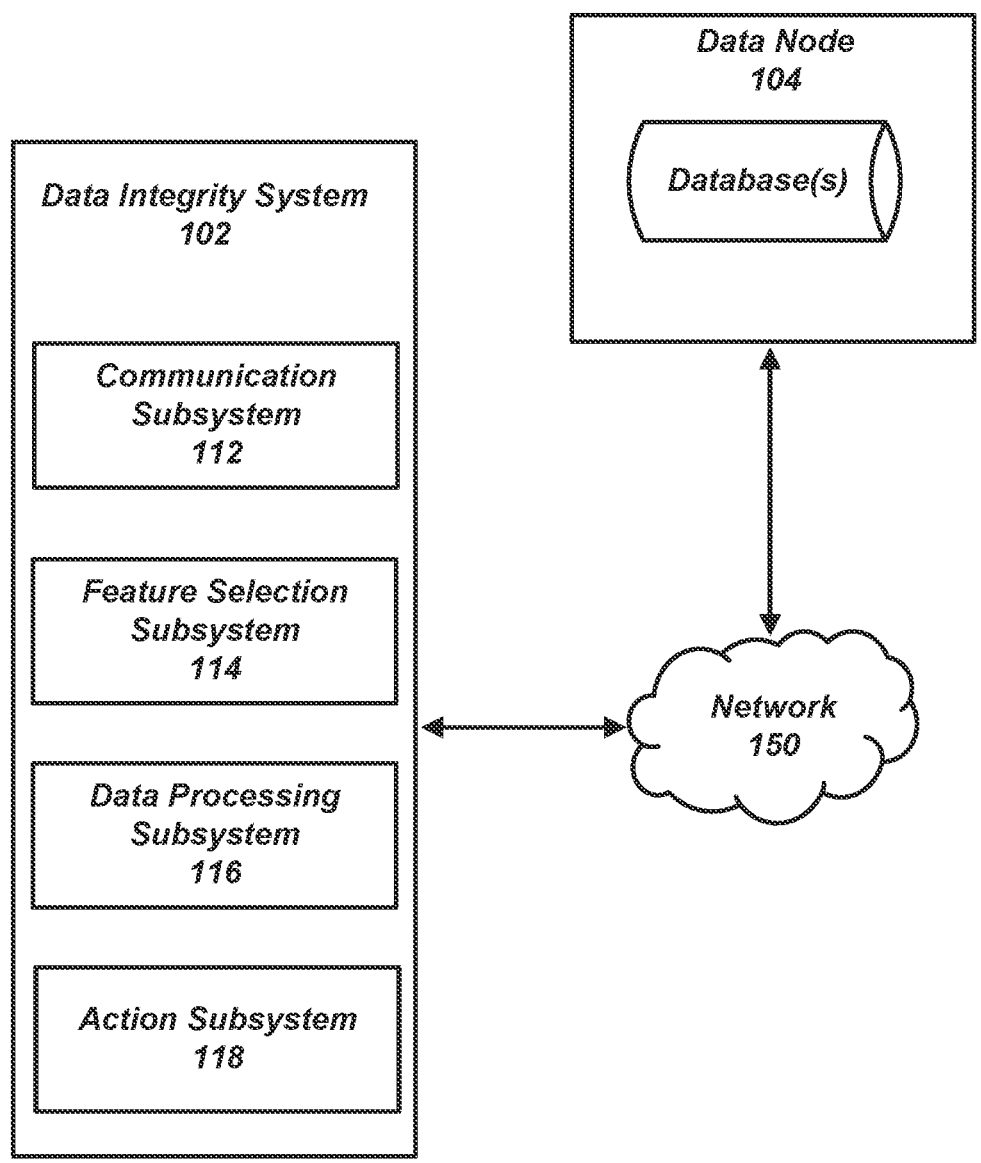
FIG. 1 shows an illustrative system for facilitating data integrity processes, in accordance with one or more embodiments of this disclosure.

FIG. 1 shows environment 100, which includes a system for facilitating data integrity processes. Environment 100 includes data integrity system 102 and data node 104. It should be noted that although data integrity system 102 and node 104 are shown as different elements, both of these elements may be housed/configured on the same server, virtual server, or on another suitable system. Data integrity system 102 may execute instructions for facilitating data integrity processes. Data integrity system 102 may include software, hardware, or a combination of the two. For example, data integrity system 102 may be a physical server or a virtual server that is running on a physical computer system.

Data node 104 may store various datasets (e.g., within one or more databases). In some embodiments, data node 104 may be a database system (e.g., Microsoft SQL® Server). Data node 104 may include software, hardware, or a combination of the two. For example, data node 104 may be a physical server, or a virtual server that is running on a physical computer system. Network 150 may be a local area network, a wide area network (e.g., the Internet), or a combination of the two.

Data integrity system 102 may be configured to access a database system and/or particular datasets (e.g., stored at data node 104). Data integrity system 102 may retrieve one or more datasets using communication subsystem 112. In some embodiments, data integrity system 102 may retrieve the one or more datasets from data node 104 using communication subsystem 112. Communication subsystem 112 may receive the dataset (e.g., via network 150). Communication subsystem 112 may include software components, hardware components, or a combination of both. For example, communication subsystem 112 may include a network card (e.g., a wireless network card and/or a wired network card) that is coupled with software to drive the card. Each dataset may include features and records which, in some embodiments, may be organized into columns (features) and rows (records). Communication subsystem 112 may pass the one or more datasets or a pointer (e.g., in memory) to the one or more datasets, to feature selection subsystem 114.

Feature selection subsystem 114 may include software components, hardware components, or a combination of both. For example, feature selection subsystem 114 may use memory and one or more processors and may be programmed with software code to perform its operations. Feature selection subsystem 114 may select, from a plurality of features in a dataset (e.g., a dataset from the one or more received/accessed datasets), a target feature and a plurality of candidate features.

In some embodiments, data integrity system 102 may be performing a statistical dispersion analysis for the whole dataset. Thus, data integrity system 102 may select each feature in turn (or in parallel if enough processors or threads are available) as the target feature for performing statistical dispersion. The other features of the dataset may be selected as candidate features. In some embodiments, data integrity system 102 may select only categorical features as a target feature or candidate features. Thus, feature selection subsystem 112 may iterate through each feature of the dataset to determine whether the features include categorical data or continuous data. For example, if a particular feature categorizes individuals by state, that feature is a categorical feature where each state is a category. However, if a particular feature includes people's salaries, that feature would be a continuous feature and thus may not be included as the target feature or the candidate features.

In some embodiments, however, feature selection subsystem 114 may map a continuous feature to a categorical feature. For example, if the feature includes people's salaries, feature selection subsystem 114 may generate salary ranges (e.g., low, medium, and high) for the salary data. One mechanism by which feature selection subsystem 114 may generate categories is to organize (sort) the values within the continuous feature (e.g., in a dataset column) into some type of order and generate categories for the feature.

FIG. 2 illustrates a portion of a dataset (e.g., a portion of a database table) that includes a plurality of features and a plurality of records. Dataset 200 includes a plurality of features (columns) and a plurality of records (rows). Feature 203 includes values for shapes, feature 206 includes values for colors, feature 209 includes values for material and feature 212 may be another feature. Field 201 may include an identifier of the record. It should be noted that dataset 200 may include other features and may include many records (e.g., thousands, millions, billions, etc.). Feature selection subsystem 114 may pass the selections to data processing subsystem 116.

Data processing subsystem 116 may include software components, hardware components, or a combination of both. For example, data processing subsystem 116 may use memory and one or more processors and may be programmed with software code to perform its operations. When the target feature and the candidate features are selected, data processing subsystem 116 may determine, for each of the plurality of candidate features, a corresponding first measure of statistical dispersion, based on the target feature for a corresponding set of records. For example, data processing subsystem 116 may compute a gini impurity value for the target feature as it relates to each candidate feature.

To calculate the gini impurity value, data processing subsystem 116 may generate a first set of groups based on a first candidate feature. Each group in the first set of groups may include a corresponding set of records having a matching candidate feature. FIG. 3 illustrates possible groupings of records when the target feature is shape and the candidate feature is color. Group 301 shows records of category "cube" in the target feature. Group 303 shows records of category "sphere" in the target feature, and group 305 shows records of category "cone" in the target feature. For each group, data processing subsystem may calculate a gini impurity value for the candidate feature as it is related to the target feature. For example, if the candidate feature is color, data processing system may retrieve group 301 (that includes two blue values and one red values) group 303 (that includes one red value and one blue value), and group 305 (that includes one green value and one blue value). Data processing subsystem 116 may calculate the gini impurity value for each group using the equation below:

$$G = \sum_{i=1}^{C} p(i) * (1 - p(i))$$

Where G is the gini impurity value for a particular group, C is the number of classes and p(i) is the probability of randomly picking an element of class i. Accordingly, based on the groups in FIG. 3, gini impurity value for group 301 is 0.44 while the gini impurity value for group 303 and group 305 is 0.5. To calculate the gini impurity value for the "color" feature, data processing subsystem 116 may calculate a weighted average of each value. For the groups in FIG. 3 the calculation of the average would yield a 0.476 gini impurity value. Thus, the "color" feature would have a gini impurity value of 0.476. Data processing subsystem 116 may repeat this process to calculate the gini impurity values for other features in the dataset (e.g., every candidate feature of the dataset).

Data processing subsystem 116 may select a first feature having a lower first measure of statistical dispersion than other features in the plurality of candidate features. For example, data processing subsystem 116 may select "color" as the candidate feature with the lowest gini impurity value. When data processing subsystem 116 makes the selection, data processing subsystem 116 may determine whether the measure of statistical dispersion is zero. If the measure of statistical dispersion is zero, data processing subsystem 116 may stop further processing based on the particular candidate feature. That is, if the measure of statistical dispersion is zero, it means that the target feature is correlated to the candidate feature. That is, every value in the target column would have a specific mapping to a value in the candidate column. However, as shown in FIG. 3, the measures of statistical dispersion are not zero, thus, there is no direct correlation between the target feature ("shape") and the candidate feature with the lowest value ("color").

In response to determining that the lower first measure of statistical dispersion is not zero, data processing subsystem 116 may determine for each combination of the first feature and another feature of the plurality of candidate features, a corresponding second measure of statistical dispersion based on the target feature for the corresponding set of records. In some embodiments, data processing subsystem 116 may calculate a gini impurity value for other candidate features as related to the combination of the target feature and the first feature having the lower first measure of statistical dispersion.

In some embodiments, data processing subsystem 116 may generate a second set of groups based on a combination of the first feature having the lowest first measure of statistical dispersion and a different candidate feature of the plurality of candidate features, wherein each group includes another set of rows having matching values in both the different candidate feature and the first feature having the lowest first measure of statistical dispersion. FIG. 4 illustrates possible groupings based on a combination of a target feature and a selected first candidate feature. Group 401 illustrates that for a combination of the target feature value ("cube") and a first feature value ("blue") there is always the same second feature ("metal"). Groups 403, 405, 407, 409, and 411 illustrate the same thing. Data processing subsystem 116 may repeat this process for other candidate features in the dataset to identify the lowest measure of statistical dispersion as each candidate feature relates to the combination of the target feature and the first feature. Thus, in FIG. 4, there is zero statistical dispersion for the combination of the "color" feature and "material" as related to the target feature ("shape"). For example, as shown in FIG. 4, if an object is made of wood and it is red, it must be a cube.

When the data processing subsystem 116 calculates measures of statistical dispersion for each candidate feature as it is related to the combination of the target feature and the first feature, data processing subsystem 116 may selecting a second feature having a lower second measure of statistical dispersion in combination with the first feature than any other feature combination. For example, if the dataset in FIG. 4 does not have another feature with the measure of statistical dispersion equal to zero, data processing subsystem 116 may select the "material" feature as the second feature.

Data processing subsystem 116 may continue performing this process for the target feature until a threshold is satisfied or until a stop condition is met. For example, the stop condition may be that a combination of features has reached a certain number (e.g., 5, 10, 15, etc.) or the stop condition may be when the number of records in a group reaches a certain number (e.g., 2). That is, in some instances, it may not be useful to calculate statistical dispersion for a group of 1 record. Therefore, in some embodiments, data processing subsystem 116 may determine a number of records in each group and if one or more groups have 1 record, data processing subsystem 116 may stop processing.

In some embodiments, the data processing subsystem may determine whether the lower second measure of statistical dispersion satisfies a threshold. The threshold may be zero or another suitable value. In response to determining that the lower second measure of statistical dispersion satisfies a threshold, generate a mapping that includes an association between an identifier of the target feature and a combination of first identifier associated with the first feature and a second identifier associated with the second feature.

Data processing subsystem 116 may pass the mapping and the measure of statistical dispersion to action subsystem 118. Action subsystem 118 may include software components, hardware components, or a combination of both. For example, action subsystem 118 may use memory and one or more processors and may be programmed with software code to perform its operations. Action subsystem 118 may perform various operations depending on the measure of statistical dispersion. For example, if the threshold is zero the mapping may be part of a data integrity process. Thus, action subsystem 118 may generate a data integrity process based on the mapping.

FIG. 5 illustrates table 500 that may include rules for a data integrity process. Column 506 may include a list of features involved in each rule, column 509 may include a list of values for those fields and column 512 may include the target/feature value for the rule. Thus, action subsystem 118 may generate a rule that instructs the data integrity system, when for example, checking dataset updates, to search for records where the material and color features have specific values (as shown in FIG. 5) and determine whether the target feature matches the entry in the table for the combination of material and color features.

Figure 6:
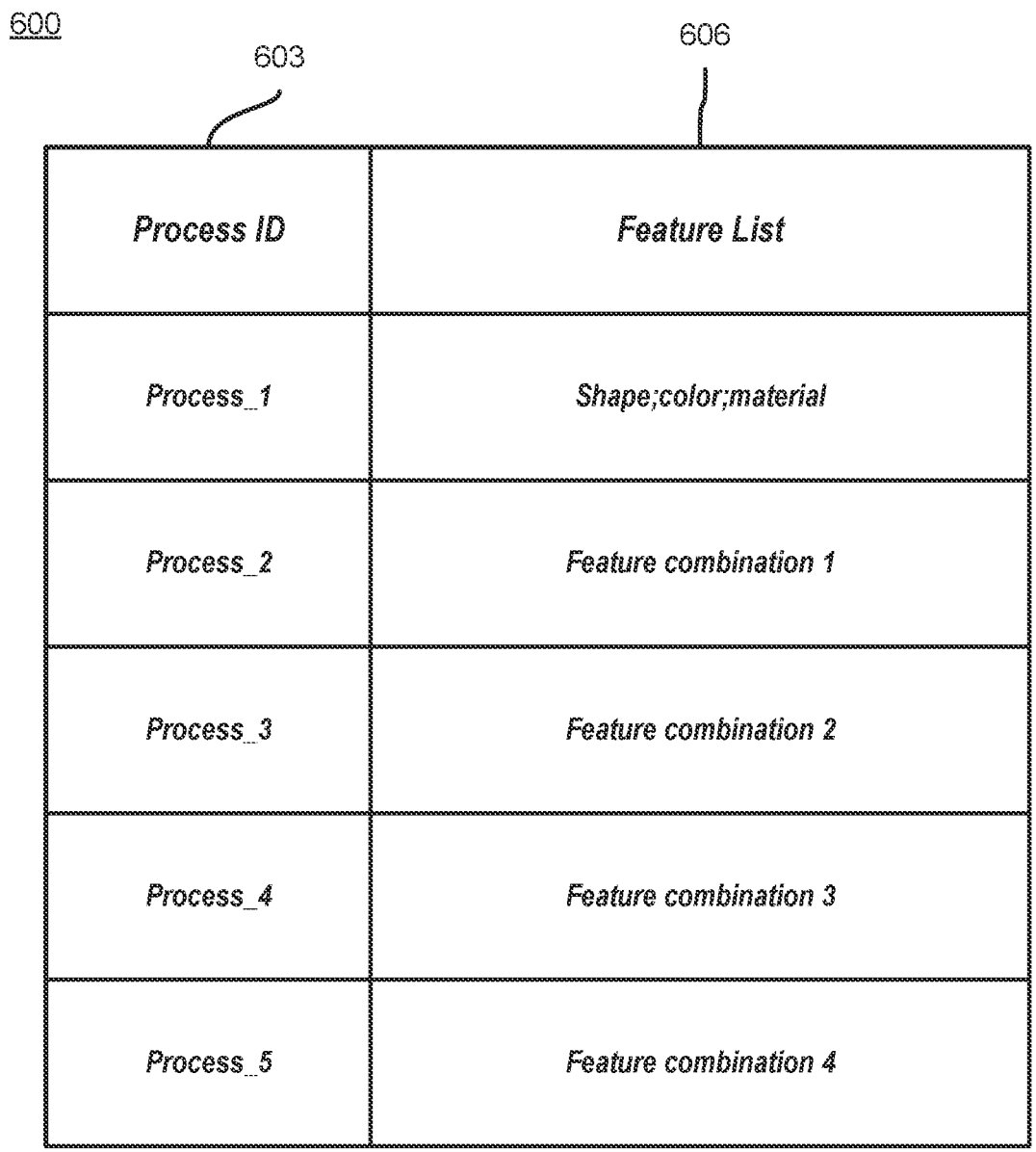
FIG. 6 illustrates table 600 of data integrity processes and corresponding features, in accordance with one or more embodiments of this disclosure.

In some embodiments, action subsystem 118 may store a table of data integrity processes. FIG. 6 illustrates table 600 of data integrity processes and corresponding features. Column 603 includes a process ID to be launched when new data is added to the database containing features in feature list 606. Thus, if a record is added to a database that includes a shape feature, a color feature, and a material feature, process_1 is launched by a system (e.g., data maintenance system) to determine whether the data meets the data integrity checks.

In some embodiments, the described mechanism may be used in a different way (e.g., for dimensionality reduction). In response to determining that for a specific dataset a measure of statistical dispersion for a combination of features is zero, a system (e.g., a data maintenance system) may remove the resulting feature from being stored for each record in the dataset, but instead generate an indicator of the feature. Thus, this process may save a large amount of database storage, especially, if there are millions of records in the database.

In some embodiments, for example, where the measure of statistical dispersion is not zero, action system 118 may identify those records which are causing the measure of statistical dispersion to be greater than zero. Action system 118 may transmit those records to a user to be examined. Action system 118 may determine that those records represent one or more anomalies in the dataset. Furthermore, action system 118 may generate categorical clusters from the dataset based on the measure of statistical dispersion. Those clusters may be used to understand which features are related to other features in the dataset. This process may enable analysis and placing records in categories, thus, performing categorical classification.

Computing Environment

Figure 7:
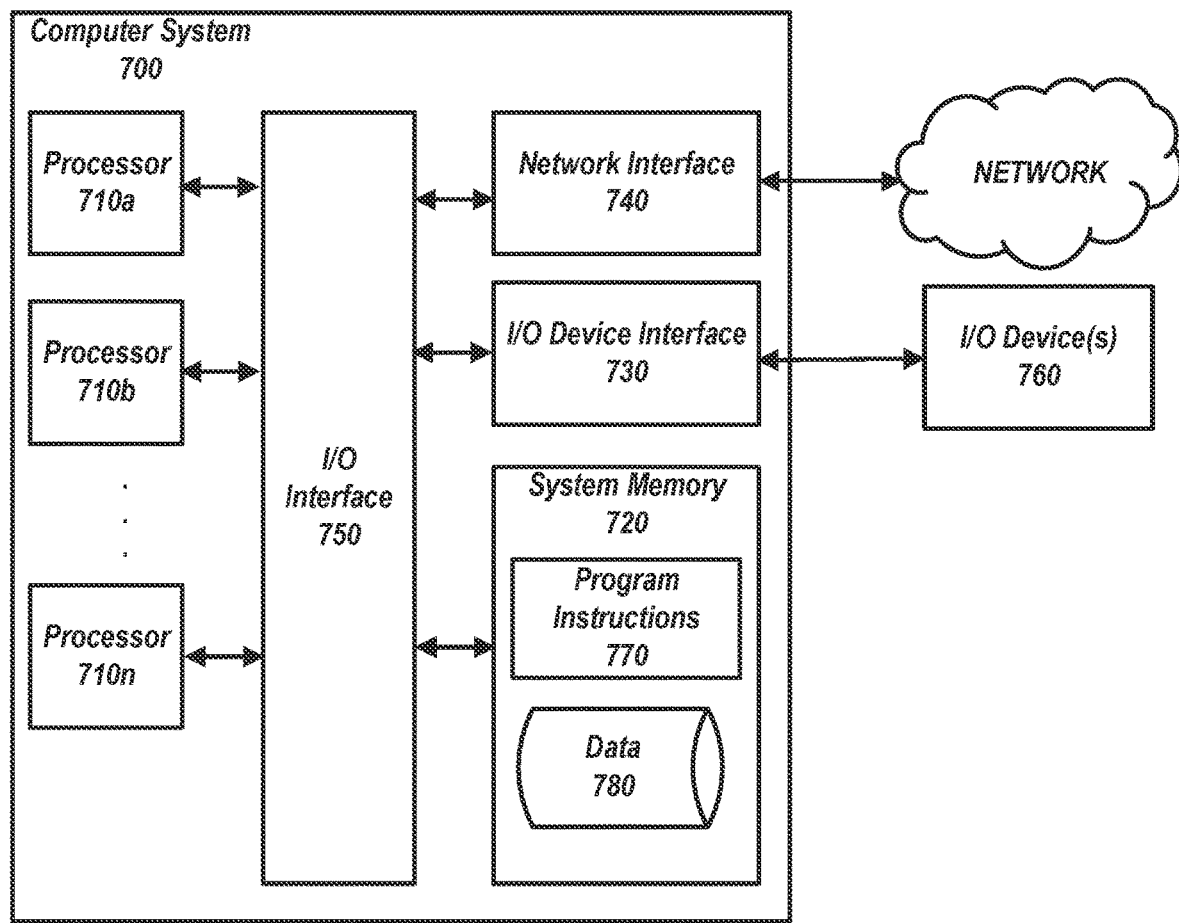
FIG. 7 shows an example computing system that may be used in accordance with one or more embodiments of this disclosure.

FIG. 7 shows an example computing system that may be used in accordance with some embodiments of this disclosure. In some instances, computing system 700 is referred to as a computer system. A person skilled in the art would understand that those terms may be used interchangeably. The components of FIG. 7 may be used to perform some or all operations discussed in relation with FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output I/O device interface 730, and a network interface 740 via an input/output (I/O) interface 750. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative, and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 700 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 8:
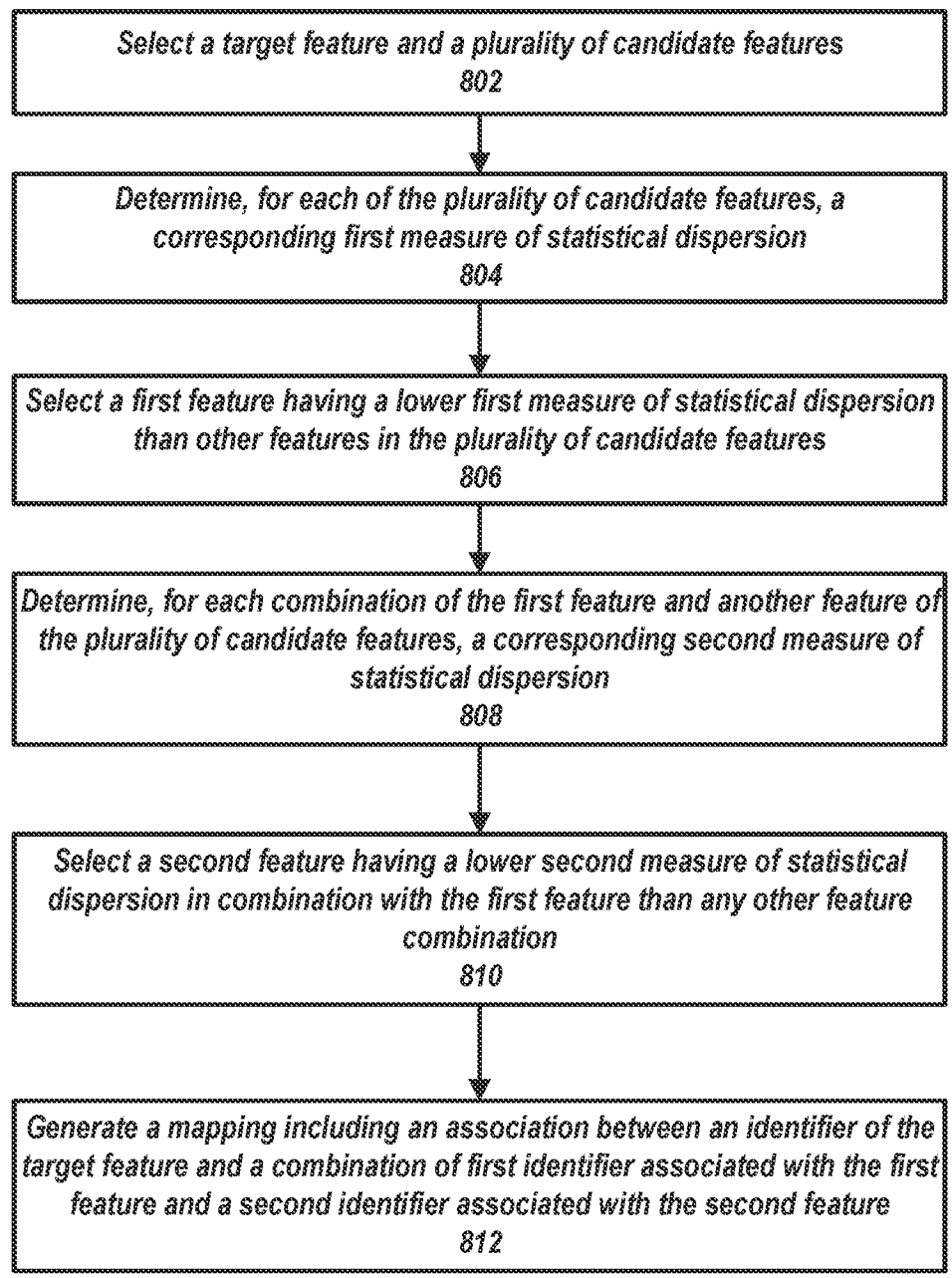
FIG. 8 is a flowchart of operations for facilitating data integrity processes, in accordance with one or more embodiments of this disclosure.

FIG. 8 is a flowchart 800 of operations for facilitating data integrity processes. The operations of FIG. 8 may use components described in relation to FIG. 7. In some embodiments, data integrity system 102 may include one or more components of computer system 700. At 802, data integrity system 102 receives a document that includes a plurality of section and selects a target feature and a plurality of candidate features. For example, the data integrity system may make the selection using one or more processors 710a, 710b, and/or 710n from the data stored in memory 720. At 804, data integrity system 102 determines, for each of the plurality of candidate features, a corresponding first measure of statistical dispersion. Data integrity system 102 may use one or more processors 710a, 710b, and/or 710n to make the determination.

At 806, data integrity system 102 selects a first feature having a lower first measure of statistical dispersion than other features in the plurality of candidate features. For example, data integrity system 102 may make the selection using one or more processors 710a-710n from the data stored in memory 720. At 808, data integrity system 102 determines, for each combination of the first feature and another feature of the plurality of candidate features, a corresponding second measure of statistical dispersion. Data integrity system 102 makes the determination using one or more processors 710a-710n.

At 810, data integrity system 102 selects a second feature having a lower second measure of statistical dispersion in combination with the first feature than any other feature combination For example, data integrity system 102 may make the selection using one or more processors 710a-710n from the data stored in memory 720. At 812, data integrity system 102 generates a mapping including an association between an identifier of the target feature and a combination of first identifier associated with the first feature and a second identifier associated with the second feature. For example, the mapping may be a database integrity rule/process that is sent to data node 104 with a command to be installed into the database system.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: selecting, from a plurality of features in a dataset, a target feature and a plurality of candidate features; determining, for each of the plurality of candidate features, a corresponding first measure of statistical dispersion, based on the target feature for a corresponding set of records; selecting a first feature having a lower first measure of statistical dispersion than other features in the plurality of candidate features; in response to determining that the lower first measure of statistical dispersion is not zero: determining, for each combination of the first feature and another feature of the plurality of candidate features, a corresponding second measure of statistical dispersion based on the target feature for the corresponding set of records; and selecting a second feature having a lower second measure of statistical dispersion in combination with the first feature than any other feature combination; and in response to determining that the lower second measure of statistical dispersion satisfies a threshold, generating a mapping comprising an association between an identifier of the target feature and a combination of first identifier associated with the first feature and a second identifier associated with the second feature.
2. Any of the proceeding embodiments, further comprising: generating a corresponding set of groups for each candidate feature, wherein each set of groups includes groups with having records with a matching candidate feature.
3. Any of the proceeding embodiments, wherein determining the first measure of statistical dispersion comprises calculating a first gini impurity value for the first set of groups.
4. Any of the proceeding embodiments, further comprising, in response to determining that the lower first measure of statistical dispersion is zero, generating the data integrity process based on the first feature and the target feature without the second feature.
5. Any of the proceeding embodiments, wherein selecting the plurality of candidate features comprises: determining, for each feature of the plurality of features other than the target feature, whether each feature of the plurality of features includes categorical data or continuous data; and selecting, for the plurality of candidate features, features having the categorical data.
6. Any of the proceeding embodiments, wherein selecting the plurality of candidate features comprises: determining that a particular feature of the plurality of features includes continuous data; and in response to determining that the particular feature of the plurality of features includes the continuous data, generating a plurality of categories for subsets of the continuous data.
7. Any of the proceeding embodiments, further comprising generating a corresponding second set of groups based on a combination of the first feature having the lower first measure of statistical dispersion and a different candidate feature of the plurality of candidate features, wherein each second set of groups includes another set of records having matching values in both the different candidate feature and the first feature having the lower first measure of statistical dispersion.
8. Any of the proceeding embodiments, further comprising: in response to determining that second lowest second measure of statistical dispersion is not zero: identifying a set of entries from a plurality of entries where a unique combination of the first feature and the second feature does not match a corresponding target feature; and providing the set of entries to a user device.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.
12. A system comprising cloud-based circuitry for performing any of embodiments 1-8.

What is claimed is:

1. A system for facilitating data integrity processes, the system comprising:
one or more processors; and
a non-transitory computer-readable storage medium storing instructions, which when executed by the one or more processors cause the one or more processors to:
access a database table comprising plurality of columns and a plurality of rows;
select a target column of the plurality of columns and a plurality of candidate columns of the plurality of columns;
determine, for each column of the plurality of candidate columns, a first corresponding gini impurity value based on field values in the target column;

select a first column of the plurality of candidate columns based on the first column having a lowest first gini impurity value of the first corresponding gini impurity values;
in response to determining that the lowest first gini impurity value is not zero:
  determine, for each column of the plurality of candidate columns other than the first column, a second corresponding gini impurity value based on the field values in the target column; and
  select a second column of the plurality of candidate columns based on the first column having a lowest second gini impurity value of the second corresponding gini impurity values; and
  in response to determining that the lowest second gini impurity value is zero, generate a data integrity rule for a target feature comprising a mapping that indicates an association between an identifier of the target column and a combination of first and second identifiers of the first column and the second column, wherein the data integrity rule indicates that a row includes valid data when a value in the target column is defined by the combination of values in the first column and the second column.

2. The system of claim 1, wherein the instructions for selecting the plurality of candidate columns of the plurality of columns further cause the one or more processors to:
determine, for each column of the plurality of columns except the target column, whether each column of the plurality of columns includes categorical data or continuous data; and
select, for the plurality of candidate columns, columns having the categorical data.

3. The system of claim 1, wherein the instructions for selecting the plurality of candidate columns of the plurality of columns further cause the one or more processors to:
determine that a particular column of the plurality of columns includes continuous data; and
in response to determining that the particular column of the plurality of columns includes the continuous data, generate a plurality of categories for subsets of the continuous data.

4. A method comprising:
selecting, from a plurality of features in a dataset, a target feature, and a plurality of candidate features;
determining, for each of the plurality of candidate features, a corresponding first measure of statistical dispersion, based on the target feature for a corresponding set of records;
selecting a first feature having a lower first measure of statistical dispersion than other features in the plurality of candidate features;
in response to determining that the lower first measure of statistical dispersion is not zero:
  determining, for each combination of the first feature and another feature of the plurality of candidate features, a corresponding second measure of statistical dispersion based on the target feature for the corresponding set of records; and
  selecting a second feature having a lower second measure of statistical dispersion in combination with the first feature than any other feature combination; and
in response to determining that the lower second measure of statistical dispersion satisfies a threshold, generating a data integrity rule for the target feature comprising a mapping that indicates an association between an identifier of the target feature and a combination of first identifier associated with the first feature and a second identifier associated with the second feature, wherein the data integrity rule indicates that a record includes valid data when a value in the target feature is defined by the combination of values of the first feature and the second feature.

5. The method of claim 4, further comprising:
generating a corresponding set of groups for each candidate feature, wherein each set of groups includes groups having records with a matching candidate feature.

6. The method of claim 4, wherein determining each corresponding first measure of statistical dispersion comprises calculating a first gini impurity value for a first set of groups.

7. The method of claim 4, wherein selecting the plurality of candidate features comprises:
determining, for each feature of the plurality of features other than the target feature, whether each feature of the plurality of features includes categorical data or continuous data; and
selecting, for the plurality of candidate features, features having the categorical data.

8. The method of claim 4, wherein selecting the plurality of candidate features comprises:
determining that a particular feature of the plurality of features includes continuous data; and
in response to determining that the particular feature of the plurality of features includes the continuous data, generating a plurality of categories for subsets of the continuous data.

9. The method of claim 4, further comprising generating a corresponding second set of groups based on a combination of the first feature having the lower first measure of statistical dispersion and a different candidate feature of the plurality of candidate features, wherein each second set of groups includes another set of records having matching values in both the different candidate feature and the first feature having the lower first measure of statistical dispersion.

10. The method of claim 4, further comprising:
in response to determining that second lowest second measure of statistical dispersion is not zero:
  identifying a set of entries from a plurality of entries where a unique combination of the first feature and the second feature does not match a corresponding target feature; and
providing the set of entries to a user device.

11. A non-transitory, computer-readable medium, storing instructions that, when executed by one or more processors, cause the one or more processors to perform operations comprising:
selecting, from a plurality of features in a dataset, a target feature, and a plurality of candidate features;
determining, for each of the plurality of candidate features, a corresponding first measure of statistical dispersion, based on the target feature for a corresponding set of records;
selecting a first feature having a lower first measure of statistical dispersion than other features in the plurality of candidate features;
in response to determining that the lower first measure of statistical dispersion is not zero:
  determining, for each combination of the first feature and another feature of the plurality of candidate features, a corresponding second measure of statistical dispersion based on the target feature for the corresponding set of records; and selecting a second feature having a lower second measure of statistical dispersion in combination with the first feature than any other feature combination; and in response to determining that the lower second measure of statistical dispersion satisfies a threshold, generating a data integrity rule for the target feature comprising a mapping that indicates an association between an identifier of the target feature and a combination of a first identifier associated with the first feature and a second identifier associated with the second feature, wherein the data integrity rule indicates that a record includes valid data when a value in the target feature is defined by the combination of values of the first feature and the second feature.

12. The non-transitory, computer-readable medium of claim 11, wherein the instructions further cause the one or more processors to perform operations comprising:

generating a corresponding set of groups for each candidate feature, wherein each set of groups includes groups having records with a matching candidate feature.

13. The non-transitory, computer-readable medium of claim 11, wherein determining a first measure of statistical dispersion comprises calculating a first gini impurity value for a first set of groups.

14. The non-transitory, computer-readable medium of claim 11, wherein the instructions for selecting the plurality of candidate features further cause the one or more processors to perform operations comprising:

determining, for each feature of the plurality of features other than the target feature, whether each feature of the plurality of features includes categorical data or continuous data; and selecting, for the plurality of candidate features, features having the categorical data.

15. The non-transitory, computer-readable medium of claim 11, wherein the instructions for selecting the plurality of candidate features further cause the one or more processors to perform operations comprising:

determining that a particular feature of the plurality of features includes continuous data; and in response to determining that the particular feature of the plurality of features includes the continuous data, generating a plurality of categories for subsets of the continuous data.

16. The non-transitory, computer-readable medium of claim 11, wherein the instructions further cause the one or more processors to perform operations comprising generating a corresponding second set of groups based on a combination of the first feature having the lower first measure of statistical dispersion and a different candidate feature of the plurality of candidate features, wherein each second set of groups includes another set of records having matching values in both the different candidate feature and the first feature having the lower first measure of statistical dispersion.

17. The non-transitory, computer-readable medium of claim 11, wherein the instructions further cause the one or more processors to perform operations comprising:

in response to determining that second lowest second measure of statistical dispersion is not zero:

identifying a set of entries from a plurality of entries where a unique combination of the first feature and the second feature does not match a corresponding target feature; and providing the set of entries to a user device.

* * * * *